United States Patent
Baillet

(10) Patent No.: US 9,958,706 B2
(45) Date of Patent: May 1, 2018

(54) TINTED OPTICAL ARTICLE

(71) Applicant: ESSILOR INTERNATIONAL (Compagnie Generale d'Optique), Charenton le Pont (FR)

(72) Inventor: Gilles Baillet, Charenton le Pont (FR)

(73) Assignee: ESSILOR INTERNATIONAL (COMPAGNIE GENERALE D'OPTIQUE), Charenton le Pont (FR)

( * ) Notice: Subject to any disclaimer, the term of this patent is extended or adjusted under 35 U.S.C. 154(b) by 0 days. days.

(21) Appl. No.: 15/095,392

(22) Filed: Apr. 11, 2016

(65) Prior Publication Data

US 2016/0313573 A1 Oct. 27, 2016

(30) Foreign Application Priority Data

Apr. 23, 2015 (EP) .................................... 15305622

(51) Int. Cl.
| | |
|---|---|
| G02C 7/10 | (2006.01) |
| G02B 1/00 | (2006.01) |
| G02C 7/12 | (2006.01) |
| G02C 7/14 | (2006.01) |

(52) U.S. Cl.
CPC ............. *G02C 7/104* (2013.01); *G02B 1/005* (2013.01); *G02C 7/10* (2013.01); *G02C 7/101* (2013.01); *G02C 7/102* (2013.01); *G02C 7/107* (2013.01); *G02C 7/108* (2013.01); *G02C 7/12* (2013.01); *G02C 7/14* (2013.01)

(58) Field of Classification Search
CPC ........ G02C 7/104; G02C 7/108; G02C 7/102; G02C 7/101; G02C 7/10; G02C 7/12; G02C 7/14; G02C 7/107; G02B 1/005
USPC ....................... 351/159.65, 159.6, 159.01, 41
See application file for complete search history.

(56) References Cited

U.S. PATENT DOCUMENTS

| | | | |
|---|---|---|---|
| 4,320,939 | A | 3/1982 | Mueller |
| 8,062,444 | B2 | 11/2011 | Begon et al. |
| 8,534,853 | B2 | 9/2013 | Ligas et al. |
| 2009/0204186 | A1 | 8/2009 | Gruber |
| 2012/0013845 | A1 | 1/2012 | Conte et al. |
| 2013/0032758 | A1 | 2/2013 | Harding et al. |
| 2013/0108858 | A1 | 5/2013 | Biteau et al. |
| 2014/0106163 | A1 | 4/2014 | Coue et al. |
| 2015/0062704 | A1 | 3/2015 | Henky et al. |

FOREIGN PATENT DOCUMENTS

| | | |
|---|---|---|
| EP | 2026950 B1 | 2/2009 |
| EP | 2602655 | 6/2013 |
| WO | 2007/088312 A1 | 8/2007 |
| WO | 2010/109154 A1 | 9/2010 |
| WO | 2013/004954 A1 | 9/2010 |
| WO | 2012/153072 A1 | 11/2012 |

*Primary Examiner* — Tuyen Tra
(74) *Attorney, Agent, or Firm* — Young & Thompson

(57) ABSTRACT

A tinted optical article includes an optical substrate providing with an optical filter wherein the optical filter is configured to selectively emit light in at least one selected range of wavelengths of light in the visible spectrum of 460 nm to 530 nm, allowing retinal exposure of a wearer eye to chronobiological blue-enriched light.

19 Claims, 3 Drawing Sheets

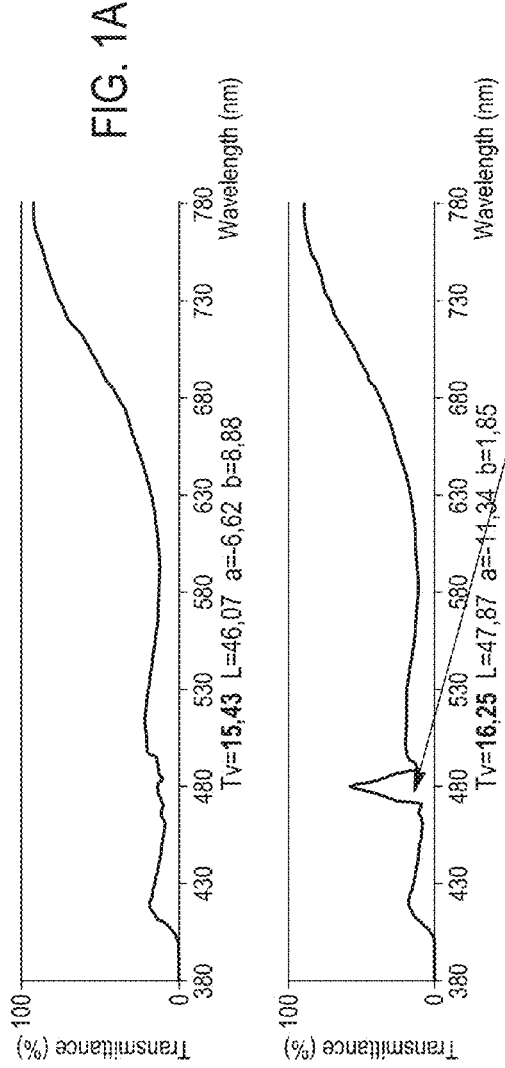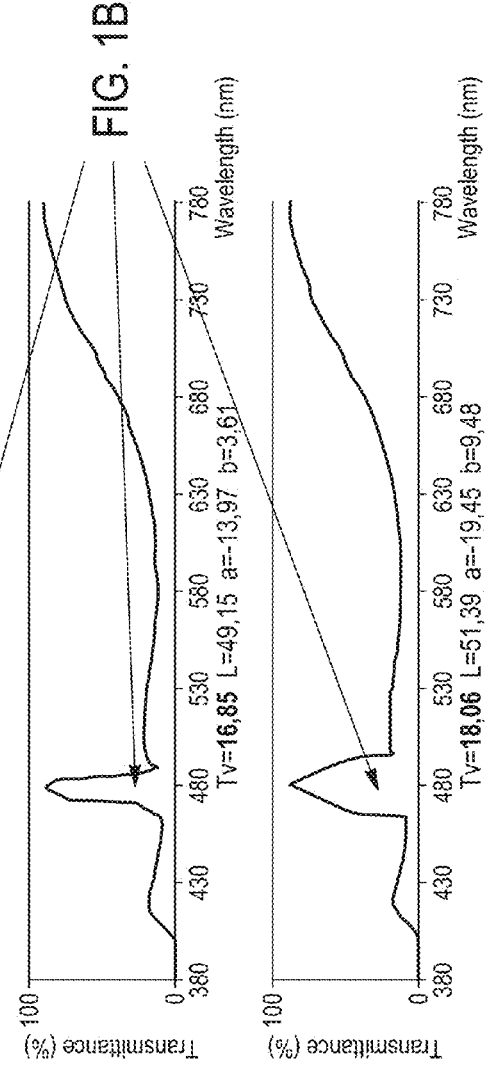

TINTED OPTICAL ARTICLE

FIELD OF THE INVENTION

The invention relates to a tinted optical article, preferably an ophthalmic lens, providing blue-enriched light exposure.

BACKGROUND OF THE INVENTION

Tinted optical article are widely used to provide visual comfort for the wearer and to protect the eyes of a wearer by preventing UV radiations or high energy visible light from damaging the eyes.

For example, tinted optical articles such as sunglasses may be designed to provide UV protection by protecting the eyes against the harmful effects of UVA and UVB rays of light and to reduce glare.

However, sunglasses significantly decrease retinal exposure of the eyes to beneficial light of the visible spectrum.

Empirical proof has evidenced that human physiology and behavior are largely influenced by retinal illumination. The vertebrate retina is a light-sensitive tissue lining the inner surface of the eye. This tissue has four main layers from the choroid to the vitreous humour: the retinal pigment epithelium, the photoreceptor layer (including rods and cones), the inner nuclear layer with bipolar and amacrine cells, and finally, the ganglion cell layer which contains some intrinsically photosensitive ganglion cells (1 to 3% of retinal ganglion cells (hereinafter referred to as "ipRGCs")). Neural signals initiate in the rods and cones, and undergo complex processing by other neurons of the retina. The output from the processing takes the form of action potentials in retinal ganglion cells, the axons of which form the optic nerve. Several important features of both visual perception and non-visual biological functions can be traced to the retinal encoding and processing of light.

In particular, it is well known that ipRGCs mediate the production of melatonin in the pineal gland. Their responses to light can alter the biological clock in the suprachiasmatic nucleus of the hypothalamus, affecting circadian rhythms.

IpRGCs influence also the regulation of several non-visual biological functions, including sleep, alertness, mood, headaches, pupillary reflex, reproduction, and immune function by absorbing beneficial blue-green wavelengths of light of the visible spectrum (hereinafter referred to as "chronobiological blue light").

Proper modulation of chronobiological blue light is thus essential, notably for proper synchronization of chronobiological rhythms.

The attenuation of beneficial light of the visible spectrum induced by sunglasses may progressively have a detrimental effect on the biological, hormonal and behavioral functions entrained by retinal illumination. A daily repeated and abusively prolonged wearing of sunglasses may interfere with the circadian rhythm of the wearer. In long-term, that might induce, for example, sleep troubles, seasonal affective disorders, mood disorders.

Furthermore, by significantly attenuating light luminance, sunglasses increase the pupil diameter with a logarithmic trend. The increase in pupil diameter, which normally accompanies decrease of illumination, may enhance to some extent optical aberrations and thus may have a deleterious effect on visual acuity.

Furthermore, the increase in pupil diameter increases the energetic irradiance of non-filtered wavelengths reaching the retina, particularly the noxious blue-violet wavelengths.

To address these problems, proposals have been made to produce sunglasses providing an optical filter configured to selectively transmit light within the range of chronobiological blue light.

Three examples of such optical articles are shown in FIG. 1B. More precisely, FIG. 1B shows the transmission spectrums of three types of sunglasses of class 3 designed to transmit chronobiological blue light and the related tint defined in the CIELAB color space whereas FIG. 1A shows the transmission spectrum of a classic sunglass of class 3 and the related tint defined in the CIELAB color space As illustrated in FIG. 1B, transmitting the range and amount of chronobiological blue light affects the color in which the optical article is perceived and the tint of the latter.

More precisely, the three sunglasses of FIG. 1B exhibit:
  A photopic transmission Tv higher than the one of the classic sunglass of FIG. 1A;
  a relative lightness L of the color higher than the one of the classic sunglass of FIG. 1A and a shift in the values of the two other chromatic coordinates a and b of the CIELAB color space.

Such proposed sunglasses unacceptably lighten and exhibit cosmetically undesirable tint, making difficult the production of sunglasses fulfilling the required transmittance properties of class 3 or 4 sunglass lenses.

Accordingly, the present invention aims to overcome the aforementioned drawbacks of the prior art.

SUMMARY OF THE INVENTION

In particular, one aim of the invention is to provide a tinted optical article that preserves the beneficial effects of chronobiological blue-enriched light exposure, without impairing the tint and/or the transmittance specifications of the article.

According to a first aspect of the invention, there is provided a tinted optical article comprising an optical substrate providing with an optical filter wherein the optical filter is configured to selectively emit light in at least one selected range of wavelengths of light in the visible spectrum of 460 nm to 530 nm, allowing retinal exposure of a wearer eye to said at least one selected range of wavelengths of light without impairing the tint of the optical article.

According to further embodiments which can be considered alone or in combination:
  the tinted optical article is further configured to solar protection;
  the tinted optical article is further configured as electrochromic, photochromic and/or polarized optical article;
  the at least one selected range of wavelengths of light is centered on a wavelength within the range 480 nm to 510 nm, with a bandwidth in a range from 20 nm to 70 nm;
  the optical filter is configured to selectively emit light within the at least one selected range of wavelengths of light with an emission rate greater than or equal to 50% and preferably, greater than 95% and more preferably equal to 100%;
  the optical filter comprises at least a luminescent agent which emits light within the at least one selected range of wavelengths of light;
  the luminescence agent is a phosphorescent material or a fluorescent material which emits light respectively by phosphorescence and by fluorescence in the at least one selected range of wavelengths of light;

the fluorescent material is a fluorescent molecule which absorbs energy in the UV portion of the light spectrum and re-emits it in the selected range of wavelengths of light;

the fluorescent material comprises fluorescents nanoparticles such as quantum dots;

the optical filter is configured to selectively and substantially reflect the selected range of wavelength of light impinging a rear face of the optical article, in the direction of the wearer eye;

the optical filter is an interferential filter;

the interferential filter exhibits a reflectance spectral profile having:

an average reflectance over the selected range of wavelengths which is greater than or equal to 50%, preferably greater than or equal to 20% a maximum reflectivity at a wavelength within the range of 480 nm to 510 nm included, with a full width at half maximum (FWHM) less than or equal to 70 nm.

the optical filter is a photonic crystal optical filter.

In an embodiment, the tinted optical article according to the invention is for use in treating chronobiological disorders.

As used herein, the term optical article includes optical lenses such as ophthalmic lenses and semifinished lens. Ophthalmic lenses are meant a lens adapted to a spectacle frame to protect the eye and/or correct the sight. Ophthalmic lenses may be corrective and non-corrective lenses and also visors, shields, masks, goggles and other vision devices intended to be worn in front of the eyes.

As used herein, an optical substrate is understood to mean an uncoated substrate, generally with two main faces corresponding in the finished ophthalmic lens to the front and rear faces thereof. The bulk is particularly made of an optical transparent material, generally chosen from transparent materials of ophthalmic grade used in the ophthalmic industry, and formed to the shape of an optical device. The optically transparent material may be a mineral or organic glass. Examples of organic glasses are those made of thermoplastic or thermosetting resin. If the transparent material is an organic glass made of thermoplastic, the thermoplastic may be selected from the group consisting of polyamides, polyimides, polysulfones, polycarbonates, polyethylene terephthalate, poly(methyl(meth)acrylate), cellulose triacetate, and copolymers thereof. If the transparent material is an organic glass made of thermosetting resin, the thermosetting resin may be selected from the group consisting of cycloolefin copolymers, homopolymers and copolymers of allyl carbonates of linear or branched aliphatic or aromatic polyols, homopolymers and copolymers of (meth)acrylic acid and esters thereof, homopolymers and copolymers of thio(meth)acrylic acid and esters thereof, homopolymers and copolymers of allyl esters, homopolymers and copolymers of urethane and thiourethane, homopolymers and copolymers of epoxy, homopolymers and copolymers of sulphide, homopolymers and copolymers of disulphide, homopolymers and copolymers of episulfide, and combinations thereof.

As used herein, the term coating is understood to mean any layer, layer stack or film which may be in contact with the optical substrate and/or with another coating, for example a sol-gel coating or a coating made of an organic resin. A coating may be deposited or formed through various methods, including wet processing, gaseous processing, and film transfer. The functional coatings classically used in optics may be, without limitation, an impact-resistant and/or adhesion primer, an abrasion-resistant and/or scratch-resistant coating, an anti-reflection coating, an antistatic coating, an anti-soiling coating, an anti-reflective coating, an anti-smudge coating, an anti-dust coating, an anti-fog coating, a water repellent coating, an anti-scratch coating, an interferential filter, a tinted coating, a mirror coating, a photochromic coating, and a combination of any of preceding compatible coatings, especially an impact-resistant primer coating coated with an abrasion and/or scratch-resistant coating.

Abrasion- and/or scratch-resistant coatings (hard coatings) are preferably hard coatings based on poly (meth) acrylates or silanes.

Recommended hard abrasion- and/or scratch-resistant coatings in the present invention include coatings obtained from silane hydrolyzate-based compositions (sol-gel process), in particular epoxysilane hydrolyzate-based composition.

The primer coatings improving the impact resistance and/or the adhesion of the further layers in the end product are preferably polyurethane or acrylic. Primer coatings and abrasion-resistant and/or scratch-resistant coatings may be selected from those described in the application WO 2007/088312 or WO2013/004954.

The antireflection coating, which improves the antireflecting properties of the final optical article by reducing the light reflection at the article-air interface over a relatively large range of the visible spectrum, may be any antireflection coating classically used in the optics field, in particular in ophthalmic field. As is well known, antireflective coatings traditionally comprise a monolayered or a multilayered stack composed of dielectric or sol-gel materials or hybrids materials (hybrid material means that said multilayered stack may comprised at least a layer comprising carbon atom, oxygen atom, and at least a metal or metalloid which is selected from silicium, zirconium, titane and niobium). These are preferably multilayered coatings, comprising layers with a high refractive index (HI, n>1.5) and layers with a low refractive index (LI, n≤1.5).

The structure and preparation of antireflection coatings are described in more details in patent application WO 2010/109154 and WO 2012/153072.

The antireflection coating may present specific reflection spectra. More particularly, in an embodiment of the invention, the optical article may comprise an antireflective coating which present a low reflection both in the ultraviolet region and in the visible region, as described in U.S. Pat. No. 8,534,853.

Coatings such as primers, hard coats and antireflection coatings according to the invention may be deposited using methods known in the art, including spin-coating, dip-coating, spray-coating, evaporation, sputtering, chemical vapor deposition and lamination. By lamination it is understood, that a flat thermoplastic film comprising at least one of said coating intrinsically or on its surface is glued to an optical substrate, directly on it or on a previous coating deposited on said optical substrate. The lamination may be done and the front and/or the rear face of the optical substrate as described in the following patents EP2026950 and U.S. Pat. No. 8,062,444.

As used herein, a coating that is "on" a substrate/coating or which has been deposited "onto" a substrate/coating is defined as a coating that (i) is positioned above the substrate/coating, (ii) is not necessarily in contact with the substrate/coating, that is to say one or more intermediate coating(s) may be interleaved between the substrate/coating and the relevant coating (however, it does preferably contact said substrate/coating), and (iii) does not necessarily completely cover the substrate/coating. When "a layer 1 is arranged under a layer 2", it is intended to mean that layer 2 is more distant from the substrate than layer 1.

As used herein, a tinted optical article is understood to mean any colored optical article or any optical article with filter category from class 0 to 4, as defined in ISO 8980-3, especially a lens of class 3 or 4, or gradient lenses.

BRIEF DESCRIPTION OF DRAWINGS

Other aims, features and advantages will be described hereafter in reference to the accompanying exemplary and non-limiting drawings:

FIG. 1A to 1B illustrate, respectively, the transmission spectrum of prior art sunglasses of class 3 and three examples of transmission spectrums of prior art chronobiological blue light-enriched sunglasses of class 3;

DETAILED DESCRIPTION OF THE INVENTION

Figure 2A:
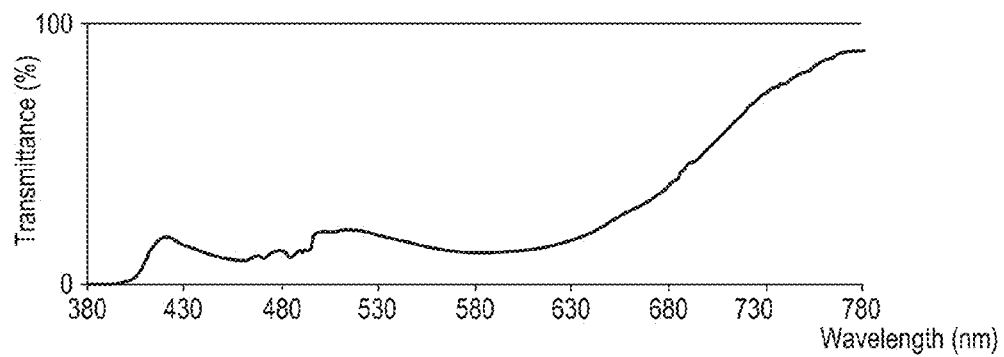
FIG. 2A to 2B illustrate the transmission spectrum respectively of prior art sunglasses of class 3 and of sunglasses according to a first embodiment of the invention.

A tinted optical article according to the invention may be used in improving visual comfort and/or in protecting a wearer's eyes against harmful light.

In a preferred embodiment, the optical article may be an ophthalmic lens for eyeglass or ophthalmic lens blanks.

It comprises an optical substrate with a first surface and a second surface.

In the specific embodiment of an ophthalmic lens, the first surface of the optical article is a concave rear/posterior face, disposed proximal to an eye of a wearer in use and the second surface is a convex front/anterior face disposed in use distal to the eye.

In an embodiment, the optical article may comprise one or several functional coatings on the optical substrate on the front face and/or rear face of the optical article.

Functional coating(s) on the rear face and on the front face may be identical or different.

The choice of the tint of the optical article is determined by the wearer desires or uses.

In an embodiment, the optical article is configured to solar protection.

In a preferred embodiment, the optical article is configured to enable light transmittance Tv in the visible spectrum from 3% to 43% (i.e. at an inhibition rate of 97% to 57%) for example depending on the level of solar protection required such as class 0 to 4 as defined by International standards such as NF EN 1836+A1_2007E or ISO_DIS 12312-1 E.

More precisely, the light transmittance Tv could be:
greater than or equal to 18% and smaller than or equal to 43%, so as to provide an optical article adapted for average luminosity environments, or
greater than or equal to 8% and smaller than or equal to 17%, so as to provide an optical article adapted for high luminosity environments, or
greater than or equal to 3% and smaller than or equal to 8%, so as to provide an optical article adapted for very high luminosity environments.

In another embodiment, the optical article is configured to enable transmittance in the visible spectrum at 80% to 100% (i.e. at an inhibition rate of 20% to 0%).

In an embodiment, the optical article is configured as an electrochromic, photochromic and/or polarized optical article.

According to the invention, the optical article comprises a selective optical filter configured to allow selectively substantial emission of at least one selected range of wavelengths of light in the visible spectrum of 460 nm to 530 nm, preferably of 480 nm to 520 nm (herewith defined as the selected range of wavelengths of light or chronobiological blue light).

In preferred embodiments, the selected range of wavelengths of light is centered on a wavelength within the range 480 nm to 510 nm with a bandwidth from 20 nm to 70 nm.

In a first preferred exemplary embodiment, the range of wavelengths is centered on a wavelength of substantially 480 nm with a bandwidth from 20 nm to 40 nm.

In a second preferred exemplary embodiment, the range of wavelengths is centered on a wavelength of substantially 490 nm with a bandwidth from 20 nm to 40 nm.

Substantial emission refers to allowing emission of the selected range of wavelength of light with an average emission rate in the range from 50% to 100%, preferably, greater than 95% or more preferably equal to 100%.

Indeed, an optical article according to the invention provides an increase of the retinal exposure within the blue-green light range of the visible spectrum, i.e. the chronobiological blue light.

Advantageously, a tinted optical article according to the invention avoid any lightening of the article configured to solar protection, i.e. avoid any modification of light photopic transmission value Tv or tint of the article while allowing efficient stimulation of photosensitive retinal ganglion cells by providing retinal exposure to beneficial chrononobiological blue light.

Figure 2B:
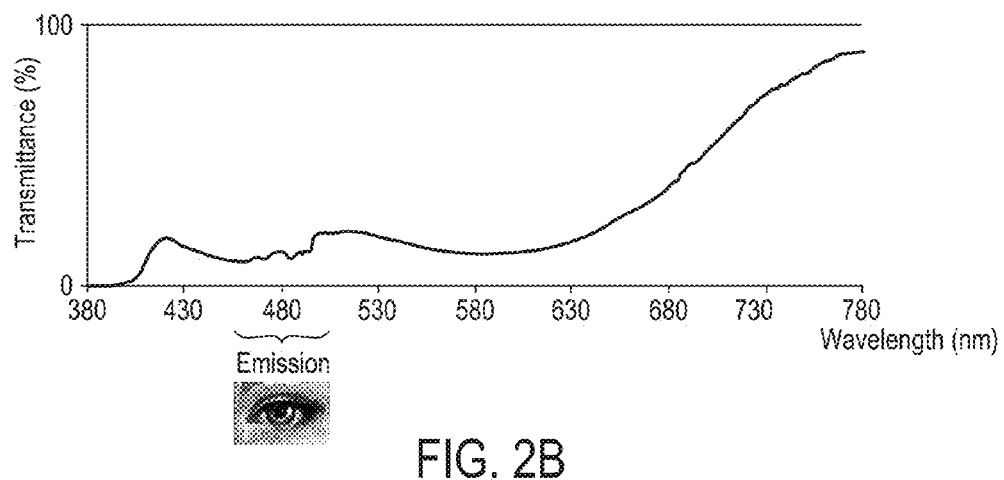

FIG. 2B illustrate such an advantage. One can observe that the transmission spectrum of the tinted optical article of class 3 according to the invention (FIG. 2B) is similar than the one of prior art sunglasses of class 3 (FIG. 2A).

Advantageously, a chronobiological blue light enriched tinted optical article according to the invention exhibits similar light photopic transmission value Tv.

Furthermore, the chromatic coordinates L, a, b of the CIELAB color space of the tint is not modified compared to a classic sunglasses of class 3.

Such tinted optical articles meet the required specifications for sunglasses while preserving the beneficial effects of chronobiological blue-enriched light exposure for the wearer.

As already mentioned, such chronobiological blue light is the best synchronizer of human non visual biological functions.

By optimizing retinal light reception in between 460 nm and 500 nm, we induce the direct stimulation of ipRGCs by melanopsin photoreception peaking at 480 nm for humans.

In particular, this specific illumination range is the most potent stimulus for entraining endogenous rhythms to the daily light cycle with the two photoreceptive processes involved: the melanopsin-driven phototransduction mechanism within the ipRGC itself, peaking near 480 nm and indirect photoreception in rods, peaking near 500 nm.

Therefore, tinted optical articles according to embodiments of the invention may be used in therapy and/or disease prevention.

In particular, they may be used in therapy for treatment of subjects suffering from chronobiological disorders such as circadian rhythm sleep disorders (jet lag delayed and advanced sleep phase syndroms), hormonal troubles, cognition and memory disorders, psychomotor disorders, body temperature deregulation, mood disorders, alertness disorders, neurobehavioral troubles, seasonal affective disorders such as fatigue and depression. Indeed, the optical device according to the invention can compensate inadequate lighting conditions (lack of beneficial blue) to help the biological clock to remain synchronized through the good blue/melatonin secretion relationship.

The optical article to any embodiment of the invention may be configured to enhance the constriction of the pupil of the eye, providing enhanced protection of the eye against harmful wavelengths (UV and/or blue-violet harmful light).

Furthermore, advantageously, an optical article according to any embodiment of the invention may be used to improve visual acuity of the wearer wearing sunglasses. The decrease in pupil size should reduce to some extent the deleterious effects on visual acuity of the optical aberrations and stray light.

A tinted optical article according to a first embodiment of the invention will be described with reference to FIGS. 2B to 3A.

In this first embodiment, the selective optical filter of the tinted optical article comprises at least a luminescent agent which emits light in the selected range of wavelengths of light.

The luminescence agent may be a phosphorescent material or a fluorescent material which emits light, respectively, by phosphorescence and by fluorescence in the selected range of wavelengths of light.

As well known, a fluorescent material absorbs light energy of a specific wavelength and re-emits light at a longer, but also visible, wavelength without reflecting substantial amounts of radiation.

The chemical nature of the fluorescent material is not particularly limited, provided that it is capable of emitting light by fluorescence, ideally a maximum emission peak, at a wavelength ranging from 460 to 510 nm, preferably from 480 to 500 nm.

Advantageously, the fluorescent material does not present any angular sensitivity.

In a non limitative way, the fluorescent material may be an organic fluorophore dye or fluorescents nanoparticles such as quantum dots.

The fluorescent materials may be used singly or in combination.

The fluorophore may be chosen, without limitation to these families, from Xanthen, Acridine, Oxazine, Polyene, Cyanine, Coumarin, combined heteroaromatics such as thiazoles, oxadiazoles such as Benzimidazolen, Tetrapyrole such as Porphin, Oxonol, Indolenine, Azamethine, Styril, Anthraquinone, Naphtalimide, Aza[18]annulene, Metal-ligand complexes, Squaraine, 8-hydroxyquinolone derivative, Polymethine, Perylene, Phtalocyanine, Diketopyrrolopyrole and any derivative or combination thereof.

In a first exemplary embodiment, the fluorescent material may be a fluorescent molecule that absorbs light in the UV and/or violet region of light (usually defined with the range 340-400 nm) and re-emits light by fluorescence mainly in the selected range of wavelengths of light.

Figure 3A:
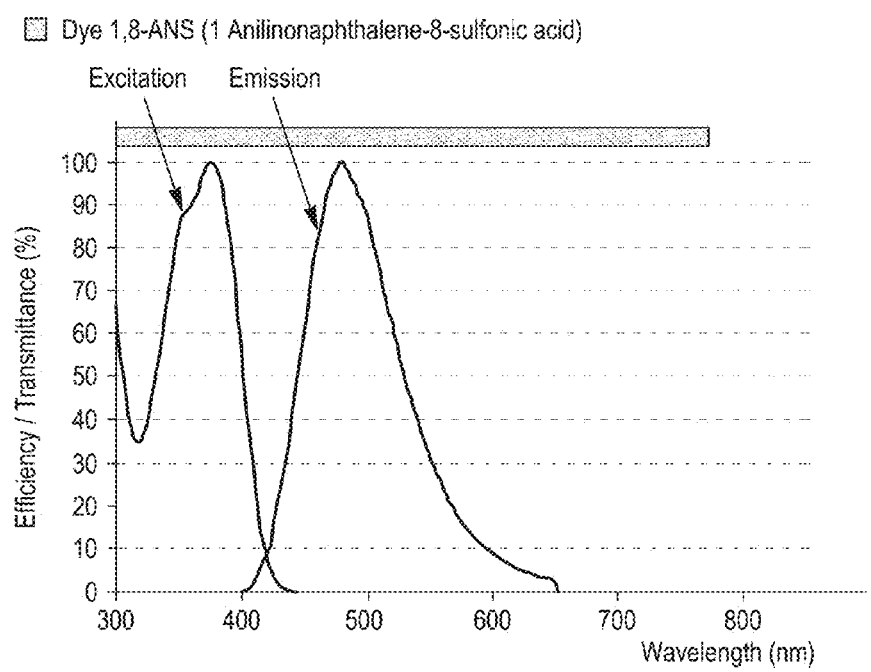
FIG. 3 illustrates the emission and excitation spectrum of fluorophores used in sunglasses according to a first embodiment of the invention.

In a non limitative example illustrated in FIG. 3A, the fluorescent molecule used may be 1-anilinonaphtalene-8-sulphonic acid which has a maximum wavelength of absorption of 375 nm and a maximum wavelength of emission of 480 nm.

Advantageously, the fluorescent material allows substantial blocking of harmful UV light while allowing retina exposure to beneficial chronobiological blue light.

In a second exemplary embodiment, the fluorescent material may be a fluorescent dye which absorbs energy in the harmful blue light portion of the light spectrum, in the 380-455 nm range, and re-emits light by fluorescence in the 460-530 nm range.

The fluorescent dye may be Cyan Fluorescent Proteins (CFP), inclusive enhanced-CFP (e-CFP).

Cyan Fluorescent Protein have a maximum wavelength of absorption of 435 nm and a maximum wavelength of emission of 475 nm.

Enhanced-CFP (e-CFP) have a maximum wavelength of absorption of 431 nm and a maximum wavelength of emission of 476 nm.

Advantageously, such fluorescent dye minimizes the amount of harmful blue light reaching the retina of the wearer while allowing retina exposure to beneficial chronobiological blue light.

With respect to fluorescents nanoparticles, they may include semiconductor nanoparticles, quantum dots, and core-shell particles. They may be chosen with limitation to these families from lead selenide (PbSe), Lead sulfide (PbS), Cadmium telluride (CdTe)/Cadmium sulfide (CdS), Cadmium selenide CdSe/Zinc sulfide ZnS or Cadmium selenide CdSe.

Advantageously, the fluorescents nanoparticules have a maximum wavelength of emission in the range 480 nm to 500 nm and an average particle size between 1.9 and 6 nanometers The methods for incorporating one or several luminescent agents into the optical substrate or a functional coating are well known in the art.

In one embodiment, one or several luminescent agents may be incorporated into the optical substrate by being dispersed in a thermoplastic or thermoset polymer material during the manufacture of the substrate itself, for example by casting or injection molding, and/or in an adhesive material more particularly when a coating will be applied to the optical substrate by a lamination process, wherein the coating is supported by a flat thermoplastic film. The adhesive used to obtain cohesive adhesion between said film and said optical substrate may advantageously comprise such luminescent agents.

The luminescent agents can be incorporated into the optical substrate by methods well known in the art, for example impregnation or imbibition methods consisting in dipping the substrate in an organic solvent and/or water based hot coloration bath, preferably a water based solution, for several minutes.

In another embodiment, the luminescent agent is incorporated into at least one layer coated on the optical substrate.

Several luminescent agents can be incorporated in the substrate and/or the same or different layers deposited at the surface of the substrate.

In a preferred embodiment, the luminescent agent is incorporated in a layer deposited on the rear face of the optical substrate.

The luminescent agent may be incorporated into any functional coating and, for example, into a primer coating, a hard coating, an abrasion/scratch resistant coating e.g. varnish, an antireflection coating, an antistatic coating.

In some exemplary embodiments, the varnish may be a varnish comprises an organic solvent medium comprising at least one organic solvent or a mixture of organic solvents, e.g. sol-gel varnishes, acrylic varnishes or polyurethane varnishes.

The luminescent agent may be deposited when the layer is prepared from a liquid coating composition or may also be included in a coating in a separate process or sub-process by spin coating, dip coating or spray coating.

The luminescent agent can also be incorporated into a film that will be subsequently transferred, laminated, fused or glued to the optical substrate or the functional coating.

Those of skill in the art should appreciate that the desired amount of luminescent agent will vary depending on several factors including the nature and amount of the agent which is used. To this end, the optimal amounts of each compound can be determined by simple laboratory experiments.

According to a second embodiment of the invention, the optical filter of the tinted optical article is configured to selectively and substantially reflect the selected range of wavelength of light impinging the rear face of the optical article, in the direction of the wearer eye.

Such optical filter comprises, rear face side of the article, a reflection filter which exhibits a reflection band within the selected range of wavelength of light and transmits the visible spectrum out of the selected range of wavelength of light.

According to the invention, the optical filter provides the rear face of the article the property of exhibiting, for an angle of incidence on this surface of 30° and 45° a spectral reflectance profile having:
- an average reflectance over a range of wavelengths ranging from 460 nm to 530 nm which is greater than or equal to 50%, preferably greater than or equal to 20%,
- a maximum reflectivity at a wavelength within the range of 480 nm to 510 nm included, with a full width at half maximum (FWHM) less than or equal to 70 nm, preferably less than or equal to 30 nm.

It should be noted that the incidence angle is typically defined as the angle between the normal to the surface at the point of incidence and the direction of the light beam contacting the first surface of the optical article. The light coming from the back of the wearer and reflected by the optical article in the direction of the wearer's eye is primarily the light incident on the first surface of the article with incidence angles between 30° and 45°.

Such spectral reflectance profile allows in particular ensuring that most of the chronobiological blue light reaches the retina of a wearer of the optical article fitted. The reflection filter acts as an optical mirror within the chronobiological blue light range of light.

In one embodiment, the optical filter may be obtained through an interferential filter in order to define the desired spectral reflectance profile according to the invention. In an exemplary embodiment, the filter is an interferential coating. The interferential filter may be manufactured using interferential technologies such as dielectric multi-layers with variable optical refractive indexes, photonic band gap materials such as liquid cristal technology, cholesteric crystals or MOF technology, or holographic gratings and any combination thereof.

In exemplary embodiments, the interferential filter may be coated on the rear face of the optical substrate such as any functional coating, e.g. anti-reflection coating, mirror coating or can be applied onto a functional coating thanks to various methods as those disclosed for the incorporation of luminescent agents described above and known form the state of art.

In one exemplary embodiment, the interferential coating of the rear face of the optical article may comprise a stack of layers of dielectric materials with a combination of layers of high refractive index (HI, n>1.5), and layers of low refractive index (LI n≤1.5) configured to define the spectral reflectance profile according to the invention.

In one embodiment, the optical filter may be obtained through a photonic crystal optical filter in order to define the desired spectral reflectance profile according to the invention.

The photonic crystal optical filter may be manufactured using photonic band gap materials.

It should be noted that the optical filter may be configured as a passive system or an active system. By passive system it is understood that the optical filter presents a filtering function which cannot be modified or changed. By active system, it is understood that the optical filter present at least a function that can be modified or changed by an external stimulation such as energy, actinic radiation, heating, etc. so that transmission of the selected range of wavelength of light may be switched on or off, or the light transmittance factor varied according to the time of day or the activity of the wearer or the exposure to light.

The invention has been described above with the aid of embodiments without limitation of the general inventive concept.

Many further modifications and variations will suggest themselves to those skilled in the art upon making reference to the foregoing illustrative embodiments, which are given by way of example only and which are not intended to limit the scope of the invention, that being determined solely by the appended claims.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the invention.

The invention claimed is:

1. A tinted optical article comprising an optical substrate with an optical filter, wherein:
   - the optical article has a front and rear face, the rear face configured to be located proximate to a wearer eye,
   - the optical filter is configured to selectively emit light in at least one selected range of wavelengths of light in the visible spectrum of 460 nm to 530 nm, allowing retinal exposure of a wearer eye located proximate to the rear face of the optical article to said at least one selected range of wavelengths of light without impairing the tint of the optical article, and
   - the optical filter is configured to selectively and substantially reflect the selected range of wavelength of light that impinges the rear face of the optical article in the direction of said wearer eye such that the optical filter emits the selected range of wavelength of light to said wearer eye.

2. The tinted optical article according to claim 1 further configured to solar protection.

3. The tinted optical article according to claim 2 further configured as electrochromic, photochromic and/or polarized optical article.

4. The tinted optical article according to claim 2, wherein the at least one selected range of wavelengths of light is centered on a wavelength within the range 480 nm to 510 nm, with a bandwidth in a range from 20 nm to 70 nm.

5. The tinted optical article according to claim 2, wherein the optical filter comprises at least a luminescent agent which emits light within the at least one selected range of wavelengths of light.

6. The tinted optical article according to claim 1 further configured as electrochromic, photochromic and/or polarized optical article.

7. The tinted optical article according to claim 1, wherein the at least one selected range of wavelengths of light is centered on a wavelength within the range 480 nm to 510 nm, with a bandwidth in a range from 20 nm to 70 nm.

8. The tinted optical article according to claim 1, wherein the optical filter is configured to selectively emit light within the at least one selected range of wavelengths of light with an emission rate greater than or equal to 50%.

9. The tinted optical article according to claim 1, wherein the optical filter comprises at least a luminescent agent which emits light within the at least one selected range of wavelengths of light.

10. The tinted optical article according to claim 9, wherein the luminescence agent is a phosphorescent material or a fluorescent material which emits light respectively by phosphorescence and by fluorescence in the at least one selected range of wavelengths of light.

11. The tinted optical article according to claim 10, wherein the fluorescent material comprises fluorescents nanoparticles such as quantum dots.

12. The tinted optical article according to claim 10, wherein the fluorescent material is a fluorescent molecule which absorbs energy in the UV portion of the light spectrum and re-emits it in the selected range of wavelengths of light.

13. The tinted optical article according to claim 10, wherein the fluorescent material is a fluorescent molecule which absorbs energy in the harmful blue light portion of the light spectrum and re-emits it in the selected range of wavelengths of light.

14. The tinted optical article according to claim 9, wherein the fluorescent material is a fluorescent molecule which absorbs energy in the UV portion of the light spectrum and re-emits it in the selected range of wavelengths of light.

15. The tinted optical article according to claim 9, wherein the fluorescent material is a fluorescent molecule which absorbs energy in the harmful blue light portion of the light spectrum and re-emits it in the selected range of wavelengths of light.

16. The tinted optical article according to claim 1 wherein the optical filter is an interferential filter.

17. The tinted optical article according to claim 16 wherein the interferential filter exhibits a reflectance spectral profile having:
   an average reflectance over the selected range of wavelengths which is greater than or equal to 50%, and
   a maximum reflectivity at a wavelength within the range of 480 nm to 510 nm included, with a full width at half maximum (FWHM) less than or equal to 70 nm.

18. The tinted optical article according to claim 16 wherein the optical filter is a photonic crystal optical filter.

19. A method of treating a subject suffering from chronobiological disorders, which comprises: providing the subject in need thereof with the tinted optical article of claim 1, for the subject to wear.

* * * * *